(12) United States Patent
Pruitt et al.

(10) Patent No.: US 7,973,251 B1
(45) Date of Patent: Jul. 5, 2011

(54) INTEGRAL JUNCTION MOUNTING PLATE

(76) Inventors: Alva Glen Pruitt, Lebanon, MO (US);
Daniel Meadows, Grass Valley, CA (US)

( * ) Notice: Subject to any disclaimer, the term of this patent is extended or adjusted under 35 U.S.C. 154(b) by 728 days.

(21) Appl. No.: 12/148,460

(22) Filed: Apr. 18, 2008

Related U.S. Application Data

(60) Provisional application No. 60/912,606, filed on Apr. 18, 2007.

(51) Int. Cl.
*H02G 3/18* (2006.01)
(52) U.S. Cl. ........ 174/659; 174/650; 174/663; 174/542; 248/200; 248/205.1
(58) Field of Classification Search .................... 174/50, 174/520, 481, 650, 663, 152 G, 153 G, 152 R, 174/542, 659; 248/215, 200, 205.1, 214; 312/223.1, 223.2, 223.6; 361/600, 601, 628, 361/605, 726, 646, 610, 41, 630
See application file for complete search history.

(56) References Cited

U.S. PATENT DOCUMENTS

| | | | | | |
|---|---|---|---|---|---|
| 3,701,926 | A | * | 10/1972 | Risk | 361/41 |
| 3,953,818 | A | * | 4/1976 | Martin et al. | 361/41 |
| 4,246,436 | A | | 1/1981 | Hoffman et al. | |
| 4,250,357 | A | * | 2/1981 | Hanke | 361/646 |
| 4,463,227 | A | * | 7/1984 | Dizon et al. | 361/628 |
| 4,491,898 | A | * | 1/1985 | Hillman et al. | 361/630 |
| 4,688,145 | A | * | 8/1987 | Mikulecky | 361/726 |
| 5,001,600 | A | * | 3/1991 | Benson | 361/610 |
| 7,633,741 | B2 | * | 12/2009 | Hughes et al. | 361/605 |

OTHER PUBLICATIONS

SFGD Pad Mounted Sectionalizing Equipment manufactured by Shallbetter, Inc., 3110 Progress Drive, Oshkosh, WI 54901.
Safefront Pad Mounted Outdoor Enclosures manufactured by Elliott Industries, Inc., PO Box 6388, Bossier City, LA 71171-6388 USA.
CW200 Series Primary Pedestal or the CW 300 Series Sectionalizing Enclosures manufactured by Maysteel, LLC, N89 W14700 Patrita Drive, Menomonee Falls, WI 53052.
MEH Sectionalizing Enclosures manufactured by ABB Group, 501 Merritt 7, Norwalk, CT, 06851, USA Headquarters.
Primary Sectionalizing Enclosures manufactured by Barfield Mfg. Co., 621 Park Tower Drive, Manchester, TN 37355.

* cited by examiner

*Primary Examiner* — Angel R Estrada
(74) *Attorney, Agent, or Firm* — Richard L. Marsh

(57) ABSTRACT

A deadfront junction mounting plate comprises a sheet metal panel, a plurality of panel mounting holes, a plurality of junction module mounting holes, at least one ground shield hole and at least one parking stand wherein the plurality of junction module mounting holes are further provided with fasteners integral therewith. The sheet metal panel has a first planar portion, a second planar portion and a third planar portion, the first planar portion provided with the panel mounting holes, the second planar portion provided with the junction module mounting holes and the third planar portion provided with the parking stand and the ground shield hole. The second planar portion is disposed at an angle to the first planar portion and the third planar portion is parallel to the second planar portion.

16 Claims, 3 Drawing Sheets

INTEGRAL JUNCTION MOUNTING PLATE

RELATED APPLICATION DATA

This application claims the benefit of provisional application Ser. No. 60/912,606 filed on 18 Apr. 2007 by the inventors hereof.

BACKGROUND OF THE INVENTION

1. Field of the Invention

This invention relates to the initial installation and subsequent maintenance of deadfront electrical distribution junctions in grade level junction enclosures and specifically to a mounting plate for the deadfront grade level electrical enclosure and a method of making the mounting plate.

2. Prior Art Statement

In an electrical distribution system, especially in a residential or light industrial environment, a junction enclosure is utilized to provide security, environmental protection, a physical safety bather and a stable mounting for subsequent electrical service junction switching and maintenance operations. A typical junction enclosure is provided with a transitional mounting plate secured to the inside surface of the back panel of the enclosure. The mounting plate is subsequently field configured for the intended installation. At the time of configuration, the typical mounting plate must be removed from the junction enclosure, configured by installing a junction module thereto with up to three junction mounting straps, six bolts, lock washers and nuts and thereafter remounted to the back panel of the junction enclosure.

It is known to provide a rigidly bolted junction mounting plate for an electrical junction enclosure wherein the mounting plate is supplied with four or more threaded fasteners to secure the mounting plate to the back panel of the junction enclosure. For instance, see the SFGD Pad Mounted Sectionalizing Equipment manufactured by Shallbetter, Inc., 3110 Progress Drive, Oshkosh, Wis. 54901 or the Safefront Pad Mounted Outdoor Enclosures manufactured by Elliott Industries, Inc., PO Box 6388, Bossier City, La. 71171-6388 USA. There are slots, holes, or a combination thereof in the mounting plate for various configurations of junctions. The parking stand is produced separately and welded to the mounting plate for the use of portable feed-thru and standoff bushing devices for field switching and maintenance. A threaded insert is welded to the plate to accommodate tank grounding connectors. At assembly of junctions to a rigidly bolted mounting plate, the following steps are required:

1. Remove four or more fasteners from studs protruding from the back panel of the enclosure to release the mounting plate from the enclosure.
2. Remove the mounting plate from the enclosure.
3. Assemble junction straps to the junction.
4. Assemble lock washers to mounting bolts.
5. Hold the junction in place on the mounting plate while holding the mounting plate separate from the enclosure.
6. Install mounting bolts with lock washers in turn onto the junction straps and install nuts on the mounting bolts.
7. Tighten all nuts on the junction mounting bolts.
8. Install assembled mounting plate to enclosure.
9. Install fasteners to studs projecting from the back panel of the enclosure.
10. Tighten fasteners to studs to fasten the mounting plate to the enclosure.
11. Install ground wire to the threaded insert on the mounting plate.
12. Install ground wire to the enclosure.
13. Install elbows and cables to junctions.
14. Energize the junctions in the enclosure.

This lengthy and difficult procedure is exacerbated by requiring the line person to hold onto the ten pound mounting plate while assembling components thereto. Additionally, the enclosure fasteners are often misplaced or lost. Removal and reinstallation of junctions to a rigidly bolted mounting plate requires the additional steps of prior to step 1 above though step 12 is omitted:

15. De-energize the enclosure.
16. Park and drop each applicable elbow to a portable feed-thru and/or standoff bushing
17. Remove the ground wire.

and, after removing the mounting plate from the enclosure at step 2 above,

18. Disassemble nuts, bolts, lock washers and junction straps from the junction and discard the old junction.

In the manufacture of a rigidly bolted junction mounting plate there are additional steps required as well as additional components. For instance, it is necessary to separately produce parking stands, precisely locate on the mounting plate and weld these parking stands to the mounting plate after the mounting plate is cut and formed in a die. Additionally, it is also necessary to separately provide the ground wire connection by welding a threaded insert to a front portion of the mounting plate.

Thus, there is a great need to minimize the time and effort required to install and/or maintain a pad mount electrical enclosure and to minimize the number of components required. There is also a need to minimise the cost and number of components required for the manufacture of a mounting plate.

It is also known to provide a drip-in type mounting plate which has a bottom flange received in a slotted rail and a curled over top flange received over a top rail, these rails mounted to the back panel of the enclosure. The drop-in mounting plate usually has a single threaded insert welded to the mounting plate adjacent each rail with a threaded fastener disposed therethrough for retaining the mounting plate to the rails. For instance, see the U.S. Pat. No. 4,246,436 issued on 20 Jan. 1981 to Hoffman, et al., these drop in type mounting plates used in the CW200 Series Primary Pedestal or the CW 300 Series Sectionalizing Enclosures manufactured by Maysteel, LLC, N89 W14700 Patrita Drive, Menomonee Falls, Wis. 53052 or the MEH Sectionalizing Enclosures manufactured by ABB Group, 501 Merritt 7, Norwalk, Conn., 06851, USA Headquarters or Primary Sectionalizing Enclosures manufactured by Barfield Mfg. Co., 621 Park Tower Drive, Manchester, Tenn. 37355. At assembly of junctions to a drop-in type mounting plate, the following steps are required:

1. Loosen the threaded fasteners disposed in the mounting plate to release the mounting plate from the enclosure.
2. Remove the drop-in type mounting plate from the enclosure.
3. Assemble junction straps to the junction.
4. Assemble lock washers to mounting bolts.
5. Hold the junction in place on the mounting plate while holding the mounting plate separate from the enclosure.
6. Install mounting bolts with lock washers in turn onto the junction straps and install nuts on the mounting bolts.
7. Tighten all nuts on the junction mounting bolts.
8. Install assembled junction mounting plate to enclosure.
9. Tighten fasteners to fasten the mounting plate to the enclosure.
10. Install ground wire to the threaded insert on the mounting plate.
11. Install ground wire to the enclosure.

12. Install elbows and cables to junctions.

13. Energize the junctions in the enclosure.

Only one step is removed versus the rigidly bolted mounting plate which still is a lengthy and difficult procedure requiring the line person to hold onto the ten pound mounting plate while assembling components thereto. As with a rigidly bolted mounting plate, removal and reinstallation of junctions to a drop-in type mounting plate also requires the additional steps of prior to step 1 above though step 11 is omitted:

14. De-energize the enclosure.

15. Park and drop each applicable elbow to a portable feed-thru and/or standoff bushing.

16. Remove the mounting plate ground wire.

and, between steps 2 and 3 above,

17. Disassemble nuts, bolts, lock washers and junction straps from the junction and discard the old junction.

In addition to the additional steps required as well as additional components necessary to manufacture a rigidly bolted mounting plate there are two more components required for manufacture of a drop-in type mounting plate. For instance, it is necessary to separately provide the fasteners to secure the drop-in mounting plate to the enclosure and additional operations of welding these fasteners to the flanges of the mounting plate.

It is readily apparent that it is desirable to minimise the amount of labor, number of components as well as the time required to install, replace or maintain a grade level enclosure and to reduce the number of steps and components required for manufacture of a mounting plate.

SUMMARY OF THE INVENTION

A general object of this invention is to provide a novel and improved junction mounting plate which will reduce the amount of time and effort required for manufacturing, servicing and maintaining deadfront junctions mounted on mounting plates and the installation thereof in the junction enclosure. The mounting plate of this invention has novel integral parking stands, grounding and module mounting provisions.

A more specific object is to provide a junction mounting plate which will enable a service person to reduce the amount of time and effort required for attaching and detaching a deadfront junction thereby effecting a substantial savings in effort while increasing the safety with which the operation may be accomplished.

Another more specific object is to provide a novel and improved junction mounting plate which will permit a line person to immediately remove and/or install junctions as the line person will not be required to remove the mounting plate prior to removal of the junction. The novel junction plate utilizes integral tubulated threaded provisions to accept a standard mounting bolt without a separate nut. This greatly reduces the steps necessary for mounting or removing junctions. This also improves overall product installation and maintenance costs while minimizing outage service time.

Another object is minimized manufacturing time by specialized notching and angular form methods on the junction plate. This results in a parking stand pocket for field installable field devices that is integral with the mounting plate. The integral design also provides aesthetic properties as well as reinforcement. The novel approach negates the need for a separately attached parking stand and grounding provisions. The junction plate utilizes four or more fastenings to ensure an adequate ground path to the junction enclosure body.

Another object of this invention is to provide a deadfront junction mounting plate which comprises a multiple plane sheet metal panel, a plurality of panel mounting holes disposed through the sheet metal panel, a plurality of junction module mounting holes disposed through the sheet metal panel, at least one ground shield hole disposed through the sheet metal panel and at least one parking stand integrally disposed in the sheet metal panel wherein the plurality of junction module mounting holes are further provided with fasteners integral therewith.

A primary goal of this invention is to provide a deadfront junction mounting plate which comprising a multiple plane sheet metal which has a first planar portion, a second planar portion and a third planar portion, the first planar portion provided with panel mounting holes, the second planar portion provided with threaded tubular junction module mounting holes and the third planar portion provided with at least one parking stand and at least one threaded tubular ground shield hole, the second planar portion disposed at an angle of 5 to 25 degrees to the first planar portion, the third planar portion parallel to the second planar portion and wherein a tang of the second planar portion extends behind the third planar portion, the tang adapted to receive an anchor of a portable feed-thru bushing thereagainst.

A significant feature of this invention is to provide a junction mounting plate comprising a metal plate having a plurality of junction strap mounting holes provided therethrough and an integral parking stand formed thereinto, the plurality of junction mounting holes comprising tubular extensions threaded on an interior surface thereof adapted to receive junction mounting strap bolts thereinto wherein the integral parking stand comprises an "U" shaped slot extending through metal plate. The "U" shaped slot may further be provided with an angled entrance extending above arms of "U" shaped slot and may additionally have an anchoring portion on a plane spaced a distance from "U" shaped slot.

A main purpose of this invention is to provide a junction mounting plate comprising a metal plate having a plurality of junction strap mounting holes provided therethrough and an integral parking stand formed thereinto, wherein the mounting plate is adapted to be fixedly affixed to an interior rear wall of a dead-front electrical junction enclosure, the plurality of junction mounting holes comprising tubular extensions integral with a rear surface of metal plate which are threaded on an interior surface thereof thus comprising threaded tubular extensions, the threaded tubular extensions adapted to receive junction mounting strap bolts thereinto.

DESCRIPTION OF THE PREFERRED EMBODIMENTS

While the various features of this invention are hereinafter described and illustrated as a deadfront mounting plate comprises a sheet metal panel, a plurality of panel mounting holes, a plurality of junction module mounting holes, at least one ground shield hole and at least one parking stand wherein the plurality of junction module mounting holes are further provided with fasteners integral therewith, it is to be understood that the various features of this invention can be used singly or in various combinations thereof for a deadfront mounting plate as can hereinafter be appreciated from a reading of the following description.

Figure 2:
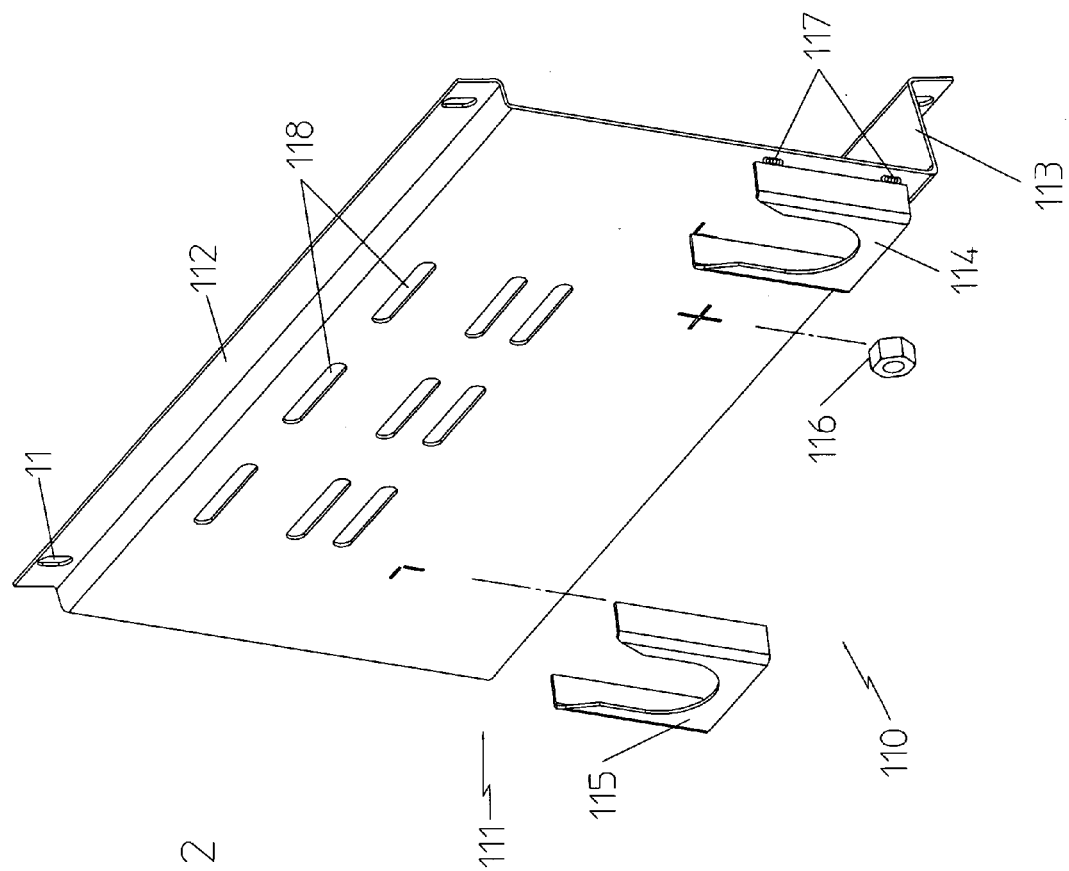
FIG. 2 is an exploded perspective view of a rigid bolted junction mounting plate showing the components required for manufacture separated from the mounting plate.
Figure 3:
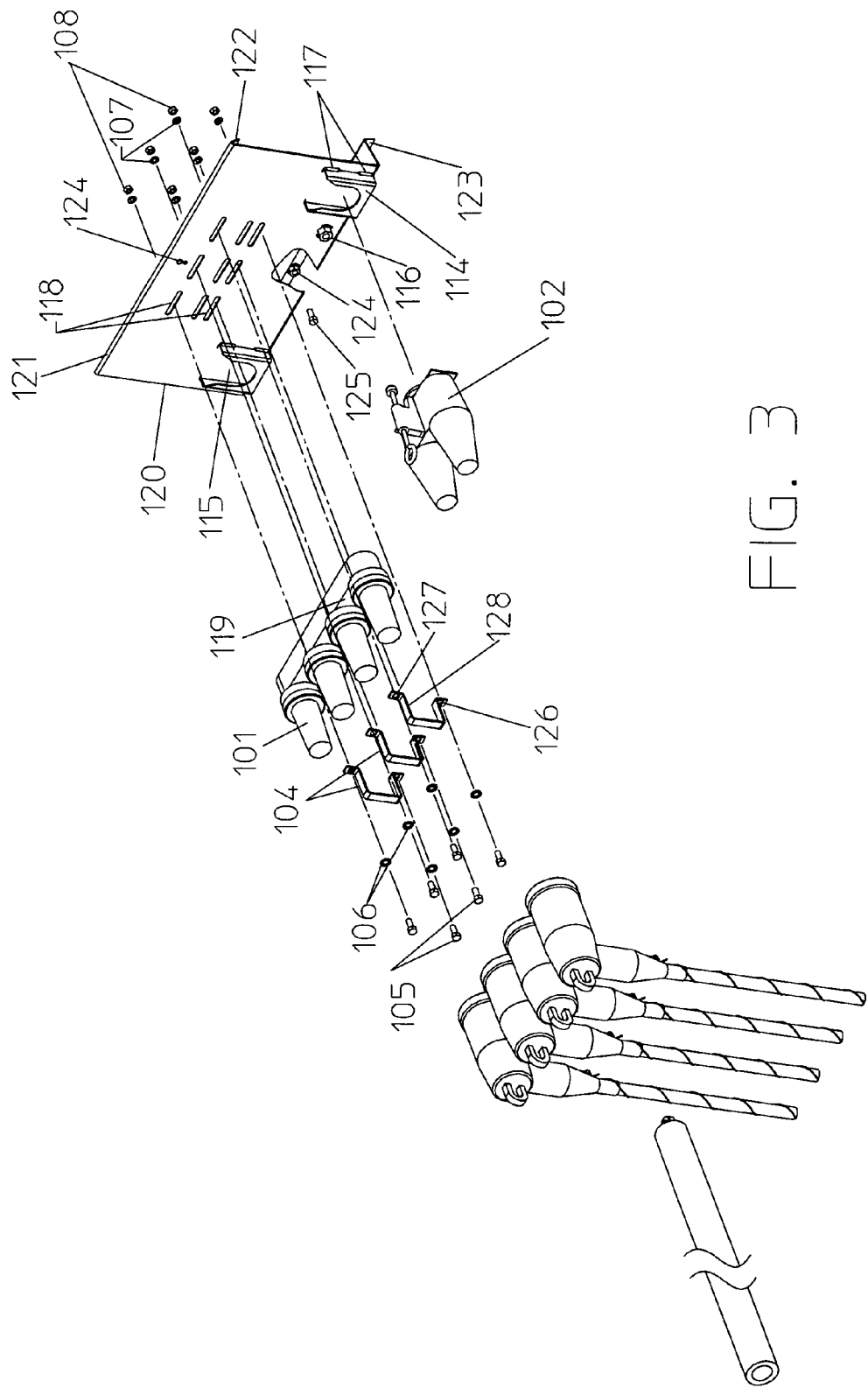
FIG. 3 is an an exploded perspective view of a drop-in junction mounting plate showing additional components for mounting to the grade level enclosure, a junction and the components required for assembly separated from the mounting plate.

Referring first to FIG. 2, the rigid bolted mounting plate 110 comprises an angled metal panel 111 having an upper flange 112 and a lower flange 113, separate parking stands 114, 115, a separate grounding nut 116, separate parking stand 114 shown welded to angled metal panel 111 at 117. Upper flange 112 has at least two panel mounting slots 11 disposed therethrough for mounting rigid bolted mounting plate 110 to a back panel of a grade level enclosure (not shown) as those skilled in the art are keenly aware. Referring also to FIG. 3 where a drop-in mounting plate 120 is shown, drop-in mounting plate 120 comprising an angled metal panel 121 having a rolled over top flange 122 and a lower step flange 123, top flange 122 adapted to be received over a rail (not shown) and lower step flange 123 adapted to be received behind a second rail (not shown), both rails mounted to a back panel of an grade level enclosure as is well known in the art. Drop-in mounting plate 120 and rigid bolted mounting plate 110 have parking stands 114, 115 welded thereto at 117, parking stands 114, 115 adapted to receive a portable feed-thru bushing 102 or a portable dead end bushing (not shown) therein and further have grounding nut 116 welded thereto, grounding nut 116 shown spaced from rigid bolted mounting plate 110 but welded to drop-in mounting plate 120. Three rows of slots 118 are provided through angled metal panel 111 or 121 which are adapted to receive mounting bolts 105 therethrough for mounting of junction 101 to mounting plate 110, mounting bolts 105 and junction 101 shown best in FIG. 3. In addition to parking stands 114, 115 and nut 116, drop-in mounting plate 120 has retaining nuts 124 welded to angled metal panel 121 approximately centrally located between the side edges thereof, retaining nuts 124 adapted to receive retaining bolts 125 therein for securing drop-in mounting plate 120 to a back panel of a grade level enclosure. Assembly of junction 101 to either rigid bolted mounting plate 110 or drop-in mounting plate 120 requires junction mounting straps 104, junction mounting bolts 105, washers 106, lock washers 107 and nuts 108. As described above, either rigid bolted mounting plate 110 or drop-in mounting plate 120 must be removed from a grade level enclosure prior to installing or removing junctions 101 thereto or therefrom as nuts 108 and washers 107 are inaccessible without removal from the enclosure.

Figure 1:
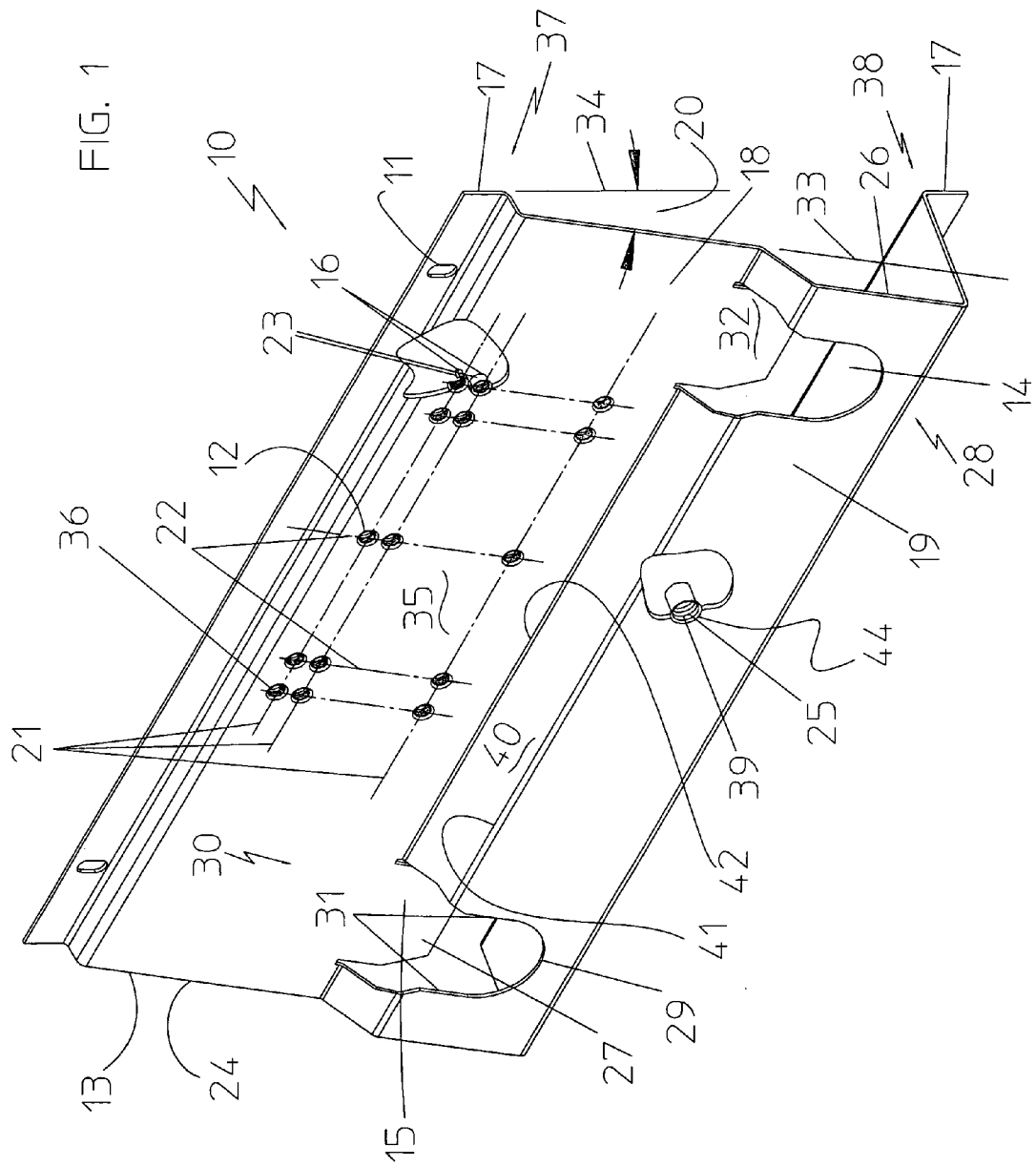
FIG. 1 is a perspective view of an embodiment of the integral junction mounting plate of this invention showing the integral parking stands and with portions cut away to show the integral fasteners for the junction mounting bolts and the ground wire.

Referring now to FIG. 1, an integral deadfront junction mounting plate of this invention generally described by the numeral 10 comprises a multiple plane sheet metal panel 13, a plurality of panel mounting slots 11 disposed through sheet metal panel 13, a plurality of junction module mounting holes 12 also disposed through sheet metal panel 13, at least one ground shield hole 44 additionally disposed through sheet metal panel 13 and at least one parking stand 15 integrally disposed in sheet metal panel 13 wherein plurality of junction module mounting holes 12 are further provided with fasteners 16 integral therewith. Multiple plane sheet metal panel 13 has a first planar portion 17, a second planar portion 18 and a third planar portion 19, first planar portion 17 provided with panel mounting slots 11, second planar portion 18 provided with junction module mounting holes 12 and third planar portion 19 provided with parking stand 15 and ground shield hole 44.

Second planar portion 18 is disposed at an angle 20 to first planar portion 17 with third planar portion 19 disposed parallel to second planar portion 18. Preferably, angle 20 is from 5 to 25 degrees and most preferably about 15 degrees.

Junction module mounting holes 12 are preferably arranged in parallel rows 21 and parallel columns 22, junction module mounting holes 12 adapted to mount common junction mounting straps 104 thereonto. Junction mounting straps 104 are fitted over a formed portion of junction modules 101 for affixing junction modules 101 to junction mounting plate 10 as is well known in the art. Three rows 21 of junction module mounting holes 12 are provided for different spans of the legs of junction mounting straps 104 by different manufacturers of junctions 101 and likewise several columns 22 of junction module mounting holes 12 are provided for different configurations of junction modules. It has been found by the inventors hereof that the two widely used junction mounting straps 104 have consistent, though different span widths and the spacing between nodes of a junction are well defined. Therefore, it is possible to provide for defined spacing of junction module mounting holes 12 into rows 21 and columns 22 instead of rows of slots of the prior art devices. As less metal is removed from junction mounting plate 10, there is no longer a need for a 0.110 inch thick plate to achieve the required structural strength. Therefore, the junction mounting plate 10 of this invention may be cut from 0.075 inch thick sheet stock resulting in further cost savings. As only junction mounting holes 12 are provided through junction mounting plate 10, fasteners 16 may be formed onto junction mounting plate 10 in a drawing process as tubular extensions 23 which extend beyond a rear surface 24 of second planar portion 18. Tubular extensions 23 are preferably threaded internally with a 5/16-18 UNC thread for receiving standard junction mounting bolts therein. Thus, it is not necessary to discard bolts 105 and lock washers 107 received with junction mounting straps 104 though it is no longer necessary to retain or use nuts 108 and washers 106. Accordingly, manufacturers of junction mounting straps 104 may also realize a cost savings as nuts 108 and washers 106 are no longer needed.

Preferably, deadfront junction mounting plate 10 also provides a tubular extension 25 behind ground shield hole 44, tubular extension 25 extending beyond rear surface 26 of third planar portion 19. Tubular extension 25 is internally threaded with 1/2-13 UNC thread for receiving a standard ground shield connector therein. As with tubular extensions 23, tubular extension 25 obviates the need for a separate nut to be welded to junction mounting plate 10 as ground shield hole 44 is provided therein. Additional cost savings to the manufacturer of junction mounting plate 10 is realized both in labor savings and material savings as a separate ground shield nut need not be stocked nor does the labor involved in accurately locating ground shield nut 116 and welding same thereto need be expended. In fact, as will become readily apparent hereinafter, providing tubular extensions 23 and 25 during the forming process accurately locates junction mounting holes 12 and ground shield hole 44 such that internal threading of tubular extensions 23 and 25 may be automated.

Deadfront junction mounting plate 10 has parking stands 14, 15 integral provided within third planar portion 19 of sheet metal panel 13, parking stands 14,15 adapted to receive feed-thru bushing 102 therein for reconnecting a load to power while servicing junction 101. Feed-thru bushing 102 is locked onto parking stand 14 or 15 with a locking anchor 109 bearing against a tang 27 of second planar portion 18, tang 27 extending behind a cutout 28 in third planar portion 19. Tang 27 may likewise receive an anchor 109 of a portable dead end bushing thereagainst. As will become readily apparent, tang 27 is created when cutout 28 is established. Either, or both, parking stands 14, 15 may have a feed-thru bushing 102 or a portable dead end bushing placed therein and locked onto tang 27 with locking anchor 109. Preferably, integral parking stand 14, 15 comprise an "U" shaped slot 29 as cutout 28, "U" shaped slot 29 extending through metal panel 13, "U" shaped slot 29 further provided with an angled entrance 30 extending above arms 31 of "U" shaped slot 29. "U" shaped slot 29 has anchoring portion 32 on a plane 33 spaced a distance from "U" shaped slot 29 provided through third planar portion 19. Preferably, plane 33 of anchoring portion 32 is coincident with second planar portion 18, however, plane 33, and hence anchoring portion 32, may alternately be disposed on a plane 34 coincident with the back wall of the grade level electrical enclosure though the time required to anchor feed-thru bushing 102 or dead end bushing to junction mounting plate 10 with a hot stick is greatly increased.

Since junction mounting plate 10 of this invention comprises metal panel 13 having a plurality of junction strap mounting holes 12 provided therethrough and integral parking stands 14, formed thereinto, junction mounting plate 10 is preferably fixedly affixed to the interior back wall of a grade level electrical junction enclosure. That is, since there is no longer a need to remove junction mounting plate 10 from the grade level enclosure as junction mounting bolts 105 are threaded into internally threaded tubular extensions 23 integral with rear surface 24 of metal panel 13, fixedly attaching junction mounting plate 10 to the back wall of enclosure results in a secure and stable mounting for junction mounting plate 10. Therefore, junction mounting plate 10 is fixedly attached to the back panel of a grade level enclosure by mounting panel mounting slots 11 formed in first planar portions 17 of junction mounting plate 10 upon studs (not shown) extending from the back panel of the grade level enclosure.

A method of mounting junction modules 101 to a dead-front grade level enclosure comprises a step of providing a junction mounting plate 10 comprised of a formed sheet metal panel 13 provided with a plurality of threaded junction strap mounting holes 12 disposed therethrough, a threaded ground shield hole 44 provided therethrough and at least one integral parking stand 14, 15 formed thereinto wherein junction mounting plate 10 is fixedly attached to threaded studs projecting from a rear wall of a dead-front grade level enclosure with mounting plate nuts threaded onto the threaded studs. In a first step, at least one junction strap 104 is assembled over a base portion 119 of junction module 101, second step of assembling a lock washer 107 to a first junction strap bolt 105. Junction module 101 is arranged on a frontal face 35 of junction mounting plate 10 and, in a third step, first junction strap bolt 105 is inserted through a hole 126 in an outwardly turned foot 127 of a one leg 128 of junction strap 104 and threaded into threaded interior 36 of junction module mounting hole 12 provided in junction mounting plate 10, the third step repeated for all other junction strap bolts 105 until all holes 126 in outwardly turned feet 127 of legs 128 of all junction straps have been provided with junction strap bolts 105 threaded into threaded interior 36 of junction mounting holes 12 with holes 126 in junction straps 104. The fourth step comprises tightening junction strap bolts 105 against outwardly turned feet 127 of junction straps 104 to secure junction 101 to junction mounting plate 10 followed by a fifth step of threading a ground shield bolt into ground shield bolt hole 44 threadedly provided through junction mounting plate 10 and affixing a free end (not shown) of ground shield wire (not shown) to the ground shield bolt. The sixth step comprises attaching the ground shield wire to the enclosure followed by installing the elbows and cables to junction 101. Finally, the enclosure is energized to provide electrical power through the junction to the downstream load. Thus, in numbered sequence, the steps required for mounting a junction to junction mounting plate 10 of this invention comprise:

1. Assemble junction straps 104 to junction 101.
2. Assemble lock washers 107 to mounting bolts 105.
3. Hold the junction in place on the junction mounting plate 10 and install mounting bolts 105 with lock washers in turn onto junction straps 104.
4. Tighten all mounting bolts 105 onto junction mounting plate 10.
5. Install ground wire to ground bolt threaded into ground hole 44 in junction mounting plate 10.
6. Install ground wire to the enclosure.
7. Install elbows and cables to junctions 101.
8. Energize the enclosure.

Removal and reinstallation of junctions 101 to junction mounting plate 10 requires the additional steps 9 through 12 prior to step 1 above though step 6 is omitted:

9. De-energize the enclosure.
10. Park and drop each applicable elbow to a portable feed-thru 102 and/or standoff bushing.
11. Remove the ground wire from the ground bolt threaded into ground hole 44.
12. Disassemble bolts 105, lock washers 107 and junction straps 104 from junction 101 and discard old junction 101.

Thus, only eight steps are required for installation of junctions 101 to junction mounting plate 10 of this invention as opposed to 14 steps for mounting new junctions 101 to rigid bolted mounting plate 110 and 13 steps for mounting new junctions to drop-in mounting plate 120. Removal of old junctions 101 and reinstallation of new junctions 101 still requires four additional steps, however, only 12 total steps are required versus 17 or 18 steps in the prior art and the line person need not hold onto the junction mounting plate as required in the prior art. As fewer steps are required for installation or maintenance of a grade level electrical enclosure, time and effort savings of this invention are fully realized.

A method of making junction mounting plate 10 comprises the steps of providing a sheet metal panel 13 of sufficient size, punching cutouts 28 from sheet metal panel 13 thus forming "U" shaped slot 29, forming offset 37 and offset 38 of first planar portion 17, forming third planar portion 19 parallel to second planar section 18, second planar portion formed at angle 20 from plane 34 of first planar portion 17 whereupon parking stands 14, 15 are defined in "U" shaped slots 29, forming junction mounting holes 12 in parallel rows 21 and parallel columns 22, forming panel mounting slots 11 on first planar portion 17, forming ground shield bolt hole 44, threading junction mounting holes 12 to produce threaded interior 36 and threading ground shield hole 44 producing threaded interior 39 thereof. In the method of forming junction mounting holes 12, junction mounting holes 12 comprise tubular extensions 23 formed through junction mounting plate 10, tubular extensions 12 threaded on interior surface 36 thereof, tubular extensions thus comprising tubular nuts. Tubular extensions 12 are formed by piercing sheet metal panel 13 with long tapered piercing pins thus drawing a portion of sheet metal panel 13 into elongated holes in a mating die plate. Likewise, tubular extension 25 of ground shield hole 44 is formed with a long tapered piercing pin which draws a portion of the metal at the location of ground shield hole into a elongated hole in a mating die plate.

Preferably, junction mounting plate 10 is formed in a progressive die wherein sheet metal panel 13 of sufficient size has parking cutouts 28 blanked out while clamping an area of sheet metal panel 13 bounded by second planar section 18, an angled slope 40 between second planar portion 18 and third planar portion 19. Junction mounting holes 12 are formed by piercing sheet metal panel 13 with long tapered pins at defined locations at the intersections of parallel columns 22 and parallel rows 21 thus drawing a portion of the metal of sheet metal panel 13 into elongated holes in a mating die plate of the progressive die. A section of the progressive die remains stationary while second planar portion moves to plane 33 thus forming third planar portion 19 above second planar portion 18. A long tapered pin is pierced through third planar portion 19 at a location defined for ground shield bolt hole 44 thus drawing a portion of the metal into an elongated hole. Outer portions of the progressive die then form lower offset 38 and upper offset 37 thus defining first planar portion 17 while punching panel mounting slots 11 through first planar portion 17. Threaded interior 36 of junction mounting holes 12 and threaded interior 39 of ground shield hole 44 are provided in separate gang threading operation.

It is also within the scope of this invention to blank out cutouts 28 from sheet metal panel 13 and thereafter form sections of junction mounting plate 10 in a bending brake. For instance, first planar portion 17 at upper offset 37 may be first formed followed by turning sheet metal panel 13 over and forming upper offset 37. Third planar portion 19 is then formed from sheet metal panel 13 by first bending sheet metal panel 13 at angle 20 along break line 42, turning sheet metal panel 13 over and bending sheet metal panel 13 at angle 20 along break line 41. Lower offset 38 is formed by clamping third planar portion 19 in the brake and bending offset 38 at substantially a ninety degree angle from third planar portion 19. First planar portion 17 at lower offset 38 is then formed by clamping first planar portion 17 in the brake and bending offset 38 at substantially a ninety degree angle from offset 38. In a piercing operation, long tapered pins are pierced through sheet metal panel 13 at defined locations at the intersections of parallel columns 22 and parallel rows 21 thus drawing a portion of the metal of sheet metal panel 13 into elongated holes in a mating die plate while another long tapered pin is pierced through third planar portion 19 at a location defined for ground shield bolt hole 44 thus thawing a portion of the metal into an elongated hole of a mating die. As in the preferred method described above, threaded interior 36 of junction mounting holes 12 and threaded interior 39 of ground shield hole 44 are provided in separate gang threading operation.

In contrast, the drop-in junction mounting plate 120 requires multiple steps to manufacture. For instance, drop-in junction mounting plate 120 must be formed essentially as is the junction mounting plate 10 of this invention, however, for a drop-in junction mounting plate 120, forming of separate parking stands 114, 115 is required as parking stands 114, 115 must be first cut, then bent, precisely located on drop-in mounting plate and finally welded, as at 117, to drop-in junction mounting plate 120. Additionally, a separate nut must be welded to drop-in mounting plate 120 at a precise location to provide for a grounding shield connector. All these steps are also required to manufacture the prior art rigid bolted mounting plate 110. In addition, drop-in mounting plate 120 also requires that separate nuts 124, 125 be welded drop-in mounting plate 120 at precise locations such that the locking bolts may be threaded therethrough to retain drop-in mounting plate 120 to the back panel of the grade level enclosure.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. A deadfront junction mounting plate comprises a multiple plane sheet metal panel, a plurality of panel mounting holes disposed through said sheet metal panel, a plurality of junction module mounting holes disposed through said sheet metal panel, at least one ground shield hole disposed through said sheet metal panel and at least one parking stand integrally disposed in said sheet metal panel wherein said plurality of junction module mounting holes are further provided with fasteners integral therewith wherein said sheet metal panel has a first planar portion, a second planar portion and a third planar portion, said first planar portion provided with said panel mounting holes, said second planar portion provided with said junction module mounting holes and said third planar portion provided with said parking stand and said ground shield hole, said second planar portion disposed at an angle to said first planar portion, said third planar portion parallel to said second planar portion.

2. A deadfront junction mounting plate as in claim 1 wherein said angle is from 5 to 25 degrees.

3. A deadfront junction mounting plate as in claim 2 wherein said angle is preferably 15 degrees.

4. A deadfront junction mounting plate as in claim 1 wherein said junction module mounting holes are arranged in parallel rows and parallel columns, said junction module mounting holes adapted to mount common junction mounting straps thereonto.

5. A deadfront junction mounting plate as in claim 4 wherein said fasteners comprise tubular nuts extending beyond a rear surface of said second planar portion.

6. A deadfront junction mounting plate as in claim 1 wherein said ground shield hole comprises a tubular nut extending beyond a rear surface of said third planar portion.

7. A deadfront junction mounting plate as in claim 1 wherein said parking stand is integral with said third planar portion of said sheet metal panel.

8. A deadfront junction mounting plate as in claim 7 wherein a tang of said second planar portion extends behind said third planar portion, said tang adapted to receive an anchor of a portable feed-thru bushing thereagainst.

9. A junction mounting plate comprises a metal plate having a plurality of junction strap mounting holes provided therethrough and an integral parking stand formed thereinto, said junction mounting plate adapted to be fixedly affixed to an interior rear wall of a dead-front electrical junction enclosure wherein said integral 10. A junction mounting plate as in claim 9 wherein said plurality of junction mounting holes comprise tubular extensions integral with a rear surface of said metal plate.

11. A junction mounting plate as in claim 10 wherein said tubular extensions are threaded on an interior surface thereof thus comprising threaded tubular extensions, said threaded tubular extensions adapted to receive junction mounting strap bolts thereinto. parking stand comprises an "U" shaped slot extending through said metal plate.

12. A deadfront junction mounting plate as in claim 7 wherein a tang of said second planar portion extends behind said third planar portion, said tang adapted to receive an anchor of a portable dead end bushing thereagainst.

13. A junction mounting plate as in claim 9 wherein said "U" shaped slot is further provided with an angled entrance extending above arms of said "U" shaped slot.

14. A junction mounting plate as in claim 13 wherein said "U" shaped slot has an anchoring portion on a plane spaced a distance from said "U" shaped slot.

15. A junction mounting plate as in claim 14 wherein said anchoring portion is disposed on said rear wall of said deadfront electrical junction enclosure.

16. A junction mounting plate as in claim 15 wherein said tubular extension is threaded on an interior surface thereof thus comprising a threaded tubular extension, said threaded tubular extension adapted to receive ground shield wire bolt thereinto.

* * * * *